United States Patent [19]

Sisk

[11] Patent Number: 4,614,023
[45] Date of Patent: Sep. 30, 1986

[54] FIELD COIL FOR DYNAMOELECTRIC MACHINE

[75] Inventor: Hollis D. Sisk, Chesterfield, Mo.

[73] Assignee: Century Electric, Inc., St. Louis, Mo.

[21] Appl. No.: 547,576

[22] Filed: Dec. 1, 1983

Related U.S. Application Data

[62] Division of Ser. No. 352,447, Feb. 25, 1982, abandoned.

[51] Int. Cl.⁴ .......................................... H02K 15/095
[52] U.S. Cl. ........................................ 29/598; 29/605;
29/732; 140/92.1; 242/1 R; 242/7.03; 310/14
[58] Field of Search ................. 29/596, 598, 605, 732,
29/736; 310/192, 194, 179, 61, 65; 242/1.1 R,
1.1 A, 1.1 E, 7.03; 140/92.1, 92.2

[56] References Cited

U.S. PATENT DOCUMENTS

| | | |
|---|---|---|
| 788,473 | 4/1905 | Johnson et al. |
| 831,625 | 9/1906 | McElroy . |
| 1,396,033 | 11/1921 | Francis .......................... 29/732 X |
| 1,819,860 | 8/1931 | Belfils . |
| 2,544,845 | 3/1951 | Link ................................ 175/362 |
| 2,904,760 | 9/1959 | Johnston ........................ 336/60 |
| 3,195,084 | 7/1965 | Book ............................... 336/60 |
| 3,445,706 | 5/1969 | Drabik ........................... 310/270 |
| 3,447,112 | 5/1969 | Broverman et al. ........... 336/60 |
| 3,471,727 | 10/1969 | Sedlock et al. ............... 310/59 |
| 3,543,067 | 11/1970 | Thorp ............................. 310/194 |
| 3,748,615 | 7/1973 | Bogner et al. ................. 336/60 |
| 3,774,298 | 11/1973 | Eley ............................... 29/605 |
| 3,810,303 | 5/1974 | Hoell ............................. 29/605 |
| 4,011,535 | 3/1977 | Koskey et al. ................. 336/57 |
| 4,035,751 | 7/1977 | Walthew ........................ 336/60 |
| 4,173,747 | 11/1979 | Grimes et al. ................. 336/60 |

FOREIGN PATENT DOCUMENTS 1226410  7/1960  France .

*Primary Examiner*—Carl E. Hall
*Attorney, Agent, or Firm*—Rogers, Howell, Moore & Haferkamp

[57] ABSTRACT

The disclosure depicts a main field coil for use in a dynamoelectric machine. The main field coil has a support having a predetermined geometry and a solid strand electrical wire wound about the support. Coil head air vents of predetermined width are inner spaced in the wound electrical wire. A structurally rigid removable means for forming the air vents is located at least partially in the air vents. The removable means is removed from the air vents after the electrical wire is wound about the support. The present disclosure describes the apparatus and a method for forming the air vents in the main field coil.

13 Claims, 13 Drawing Figures

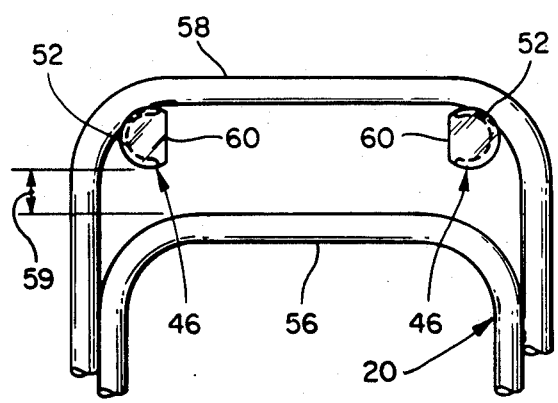
Fig. 8
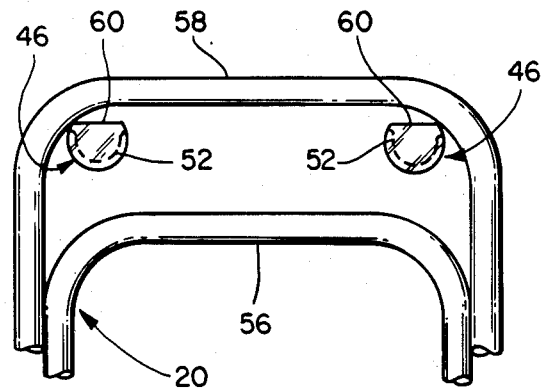
Fig. 9
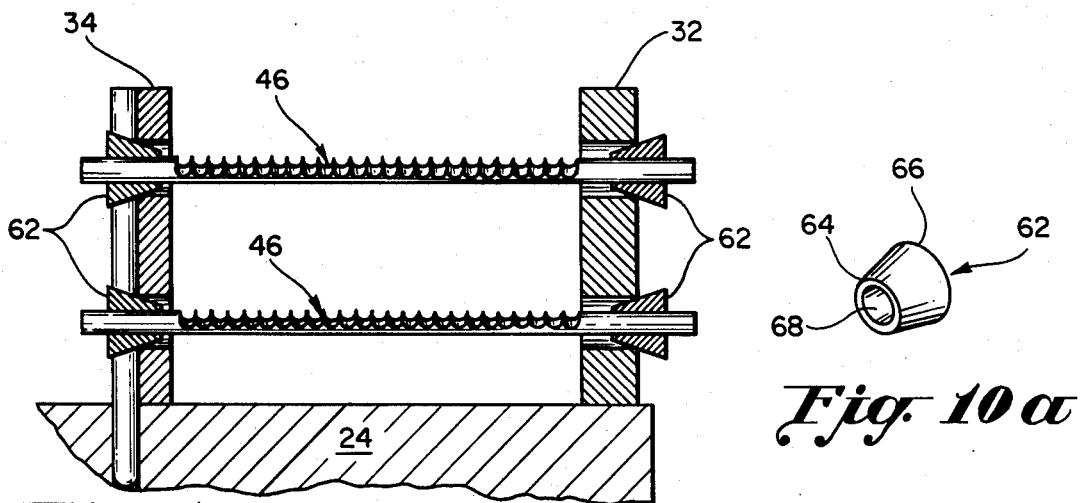
Fig. 10
Fig. 10a
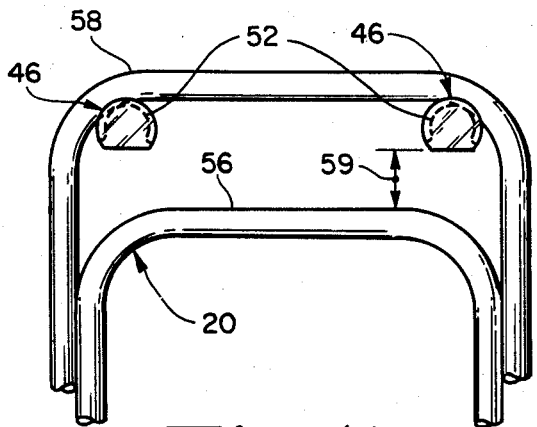
Fig. 11
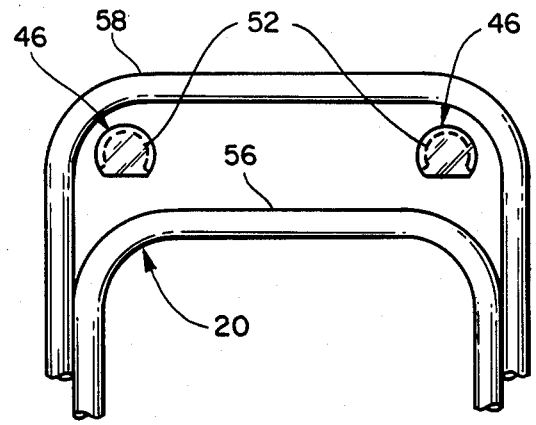
Fig. 12

FIELD COIL FOR DYNAMOELECTRIC MACHINE

This application is a division, of application Ser. No. 06/352,447, filed Feb. 25, 1982, now abandoned.

BACKGROUND OF THE INVENTION

This invention relates in general to main field coils for use in dynamoelectric machines and in particular to main field coils having air vents, for use with synchronous generators for A/C power generation. Typically the main field coils have been wound using multiple strands of small size wire connected in parallel. For ventilation and cooling purposes open areas or air vents are formed in the coil as the wire is wound. The air vents are formed by placing temporary or permanent spacers against the wiring and then winding more wire about the spacers. These types of field coils have several disadvantages. The use of multiple wires of a small size is very costly and the probability is very high that shorted turns will occur due to crossovers of the wire under winding pressure. Furthermore the resulting coil is not very rigid and may be subject to deformation. Because of the small wire size it is difficult to produce uniform field coils and the heat transfer characteristics of the coil is not very good due to the multiple layers of insulation.

The use of large size single solid wire such as round magnet wire has been utilized in the winding of main field coils. However it has been found impractical to form air vents in such coils due to the high winding tension which must be used to form the solid strand wire. This results in high winding temperatures when in use due to the lack of air vents. For the reasons given above it is more desirable to use a solid strand wire for the main field coil rather than multiple small strands of wire.

SUMMARY OF THE INVENTION

The present invention relates to a main field coil for use in a dynamoelectric machine. The main field coil has a support having a predetermined geometry and a solid strand electrical wire wound about the support. Coil head air vents of predetermined width are interspaced in the wound electrical wire. A structurally rigid removable means for forming the air vents is located at least partially in the air vents. The removable means is removed from the air vents after the electrical wire is wound about the support. The present specification describes and claims the apparatus and a method for forming the air vents in the main field coil.

OBJECTS OF THE INVENTION

It is a general object of the present invention to provide an improved main field coil for use in a dynamoelectric machine.

It is a more specific object of the present invention to provide a main field coil which has improved heat transfer characteristics and thereby operates at cooler temperatures.

It is another object of the present invention to provide a main field coil that has improved reliability and lower manufacturing cost.

It is a further object to provide a main field coil which is free standing and structurally rigid.

BRIEF DESCRIPTION OF THE DRAWINGS

The features of the present invention which are believed to be novel are set forth with particularity in the appended claims. The invention together with further objects and advantages may best be understood by reference to the following description taken in conjunction with the accompanying drawings in the several figures of which like reference numerals identify like elements, and in which:

FIGS. 7, 8, and 9 schematically illustrate one embodiment of the present invention; and FIGS. 10A, 10, 11 and 12 schematically illustrate an alternate embodiment of the present invention.

DESCRIPTION OF THE PREFERRED EMBODIMENT

Figure 1:
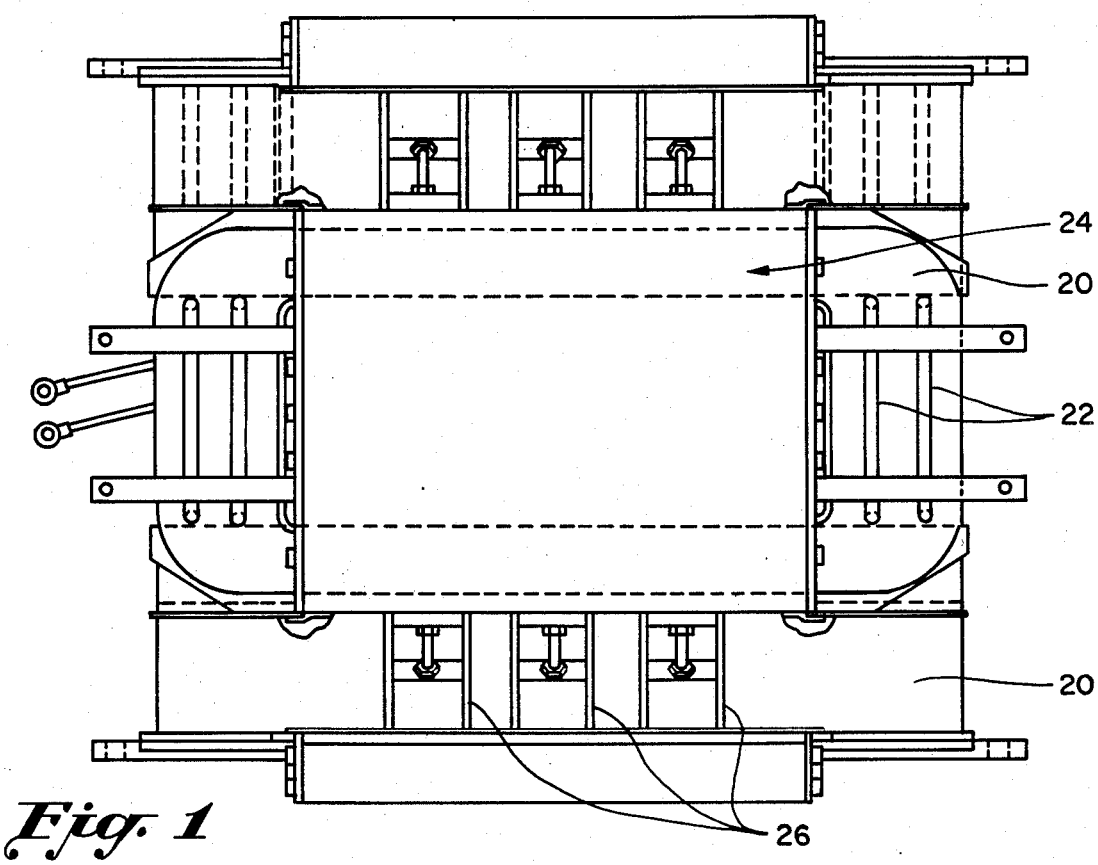
FIG. 1 is a side view of a synchronous generator utilizing the present invention.
Figure 2:
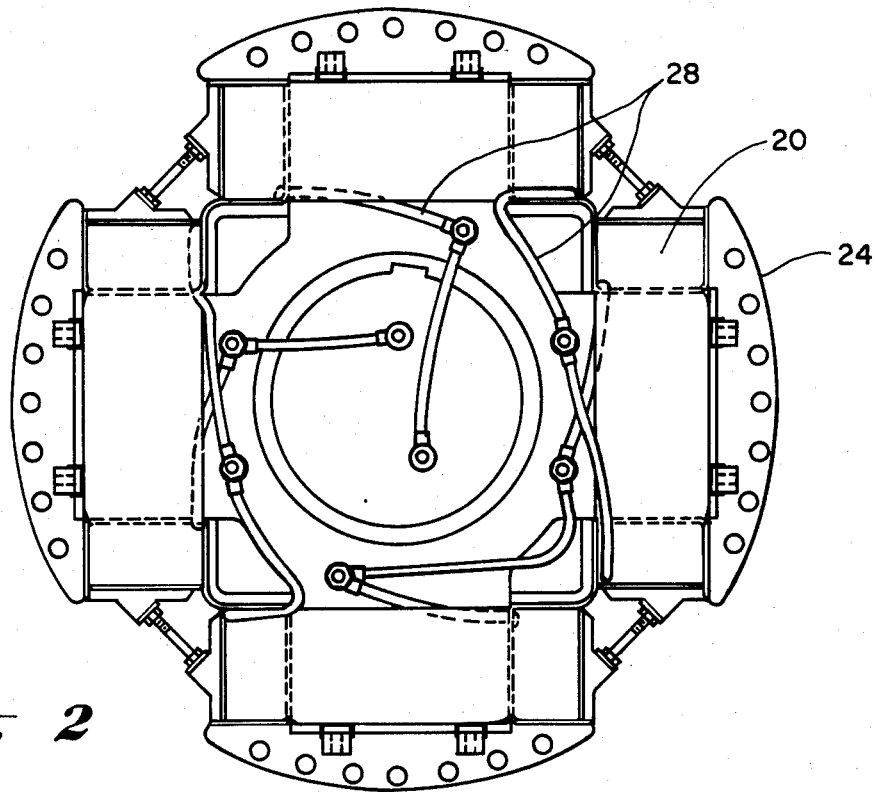
FIG. 2 is an end view of the FIG. 1 apparatus.

Whereas the invention may be implemented in dynamoelectric machines of various types, it is preferably embodied in a machine of the nature shown in FIGS. 1 and 2. The machine shown in FIGS. 1 and 2 is a synchronous generator for A/C power generation which has a main field coil. The main field coil is formed with large solid strand round magnet wire 20 with coilhead air vents 22. The wire 20 is wound about a support 24. Adjustable wedges 26 provide structural support to the main field coil. Electrical wires 28 provide electrical connection to the field coils.

The use of large solid strand wire permits precision layer winding resulting in a uniform product. The formed coil head air vents provide ventilation and cooling for the coil, and the reduced number of layers of insulation provide better heat transfer characteristics. The novel main field coil provides a significant advance over the previously known field coils and methods of winding field coils. Heretofore, main field coils having air vents have been wound using multiple strands of wire connected in parallel with the maximum diameter of such strands being approximately 0.08 inches. Any attempts to wind main field coils including air vents and using wire strands having a diameter significantly larger than 0.08 inches have proved to be impractical since the high winding tension required has introduced unacceptable deformities into such coils. However, by employing the techniques of the present invention, it has become possible to manufacture main field coils having air vents and also using solid strand wire having a diameter equal to or greater than 0.10 inches. Field coils employing the techniques of the present invention have been constructed utilizing wire having a diameter as large as 0.144 inches.

In general, the present invention is concerned with the manufacture of a main field coil for use in a dynamoelectric machine. The main field coil comprises a support having a predetermined geometry, a solid strand electrical wire wound about the support, coilhead air vents of predetermined width interspaced in the wound electrical wire, and a structurally rigid removable means for forming the air vents. The structurally rigid removable means is located at least partially in the air vents and forms the air vent. It is removed from the air vent after all the structural wire is wound about the support.

Figure 3:
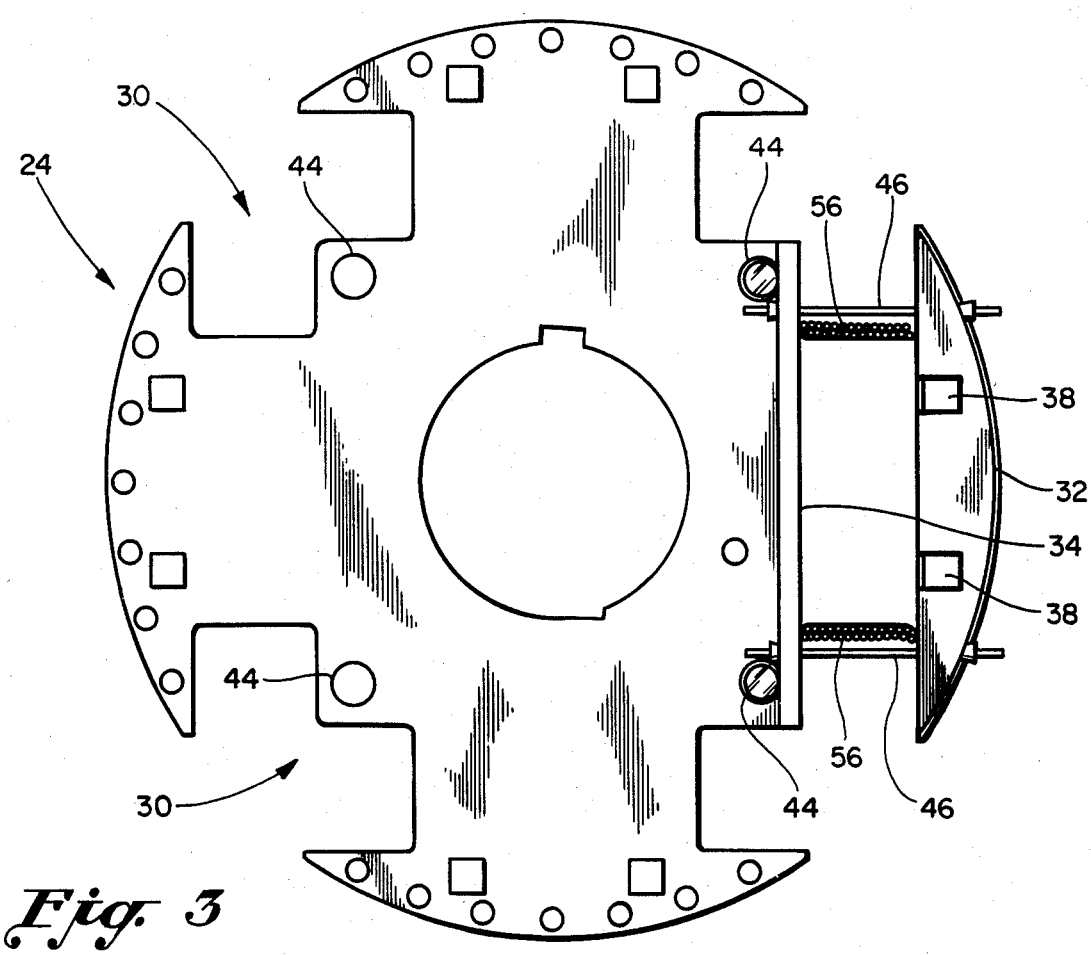
FIG. 3 is an end view of a support used in the synchronous generator and illustrating the structurally rigid removable means.
Figure 4:
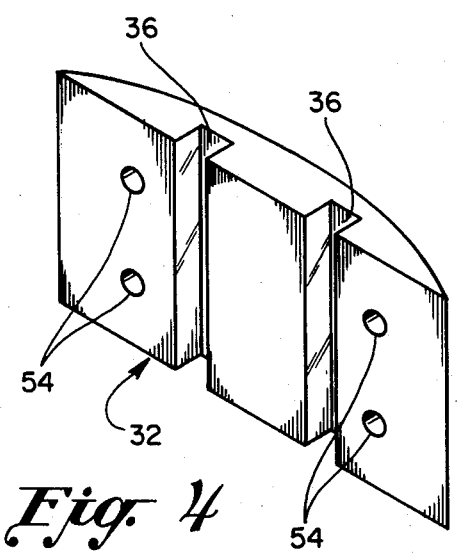
FIGS. 4 and 5 show two parts of the structurally rigid removable means.
Figure 5:
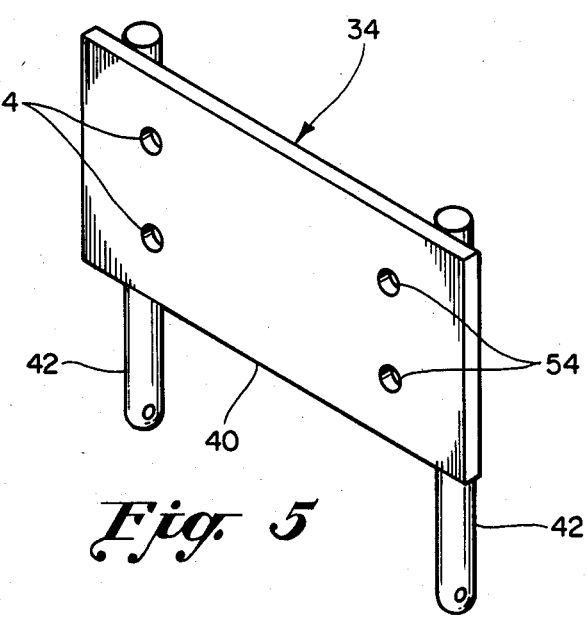
Figure 6:
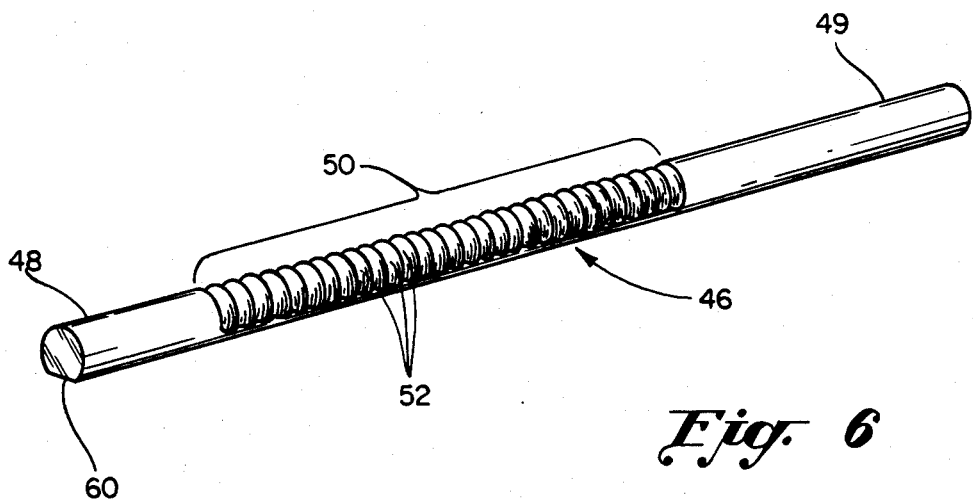
FIG. 6 is a perspective view of the device which forms air vents in the main field coil.

FIG. 3 is an end view of the support 24. The wire 20 is wound in channel 30 of the support 24. FIGS. 4, 5 and 6 are perspective views of the parts of the structurally rigid removable means, which is shown attached to the support 24 in FIG. 3.

The structurally rigid removable means comprises a temporary spacing means for forming the air vents and a temporary holding means for positioning the spacing means. The temporary holding means comprises first and second support blocks 32 and 34 shown in FIGS. 4 and 5. The first support block 32 has two parallel grooves 36 which align with two square posts 38 which are part of the support 24. The second support block 34 has a body portion 40 and two rods 42 attached to the ends of the body portion 40. The rods 42 fit into holes 44 in the support 24.

The temporary spacing means shown in FIG. 6 comprises a spacing pin 46 having firts and second ends 48 and 49. The pin 46 has a substantially circular cross section. The pin 46 also has a notched portion 50 extending a predetermined length between the first and second ends 48 and 49. The notches 52 in the notched portion 50 substantially match the diameter of the wire 20. The notches 52 may completely wrap around the pin 46 or they may wrap around only a predetermined distance.

The first and second support blocks 32 and 34 have pin receiving holes 54 which are in alignment when the first and second blocks 32 and 34 are attached to the support 24. As shown in FIG. 3, the spacing pins 46 are inserted through the pin receiving holes 54.

Figure 7:
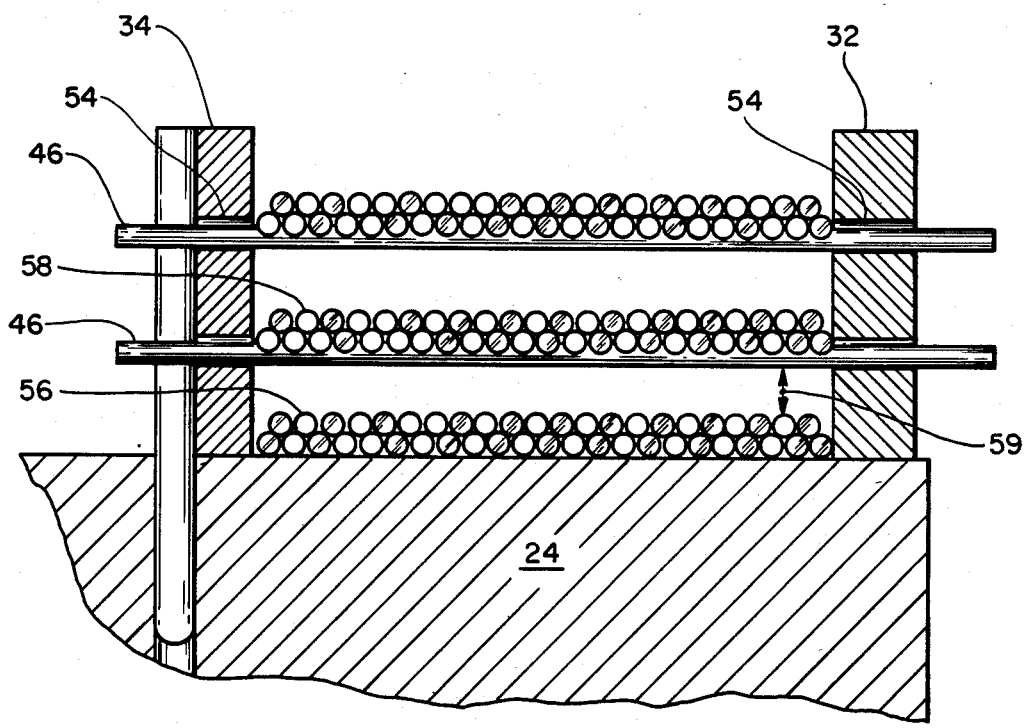

A first predetermined amount of wire is wound on the support 24 after which the spacing pins 46 are inserted through the pin receiving holes 54. Then, a second predetermined amount of wire 58 is wound about the support 24 and the spacing pins 46. FIG. 7 is a cross sectional view illustrating the windings and spacing pins. In FIG. 7, a first predetermined amount of wire 56 is wound on the support 24. Spacing pin 46 is placed through the receiving holes 54 and is located a predetermined distance 59 from the first predetermined amount of wire 56. A second predetermined amount of wire 58 is then wound about the support 24 and the spacing pins 46. As shown in FIG. 7, more spacing pins and another amount of wire may be added to form a second air vent.

FIGS. 8 and 9 illustrate how the spacing pins 46 may be removed after the wire 20 has been wound. As shown in the FIGS. 8 and 9 embodiment, the spacing pins 46 have a flat portion 60 extending the entire length of the pins 46. The spacing pins 46 are located a predetermined distance 59 above the first predetermined amount of wire 56 and near the corners of the wound wire 20. The second predetermined amount of wire 58 is wound across the spacing pins 46 and engage the notches 52 in the notched portion 50. Since the wire 20 is a large solid strand round magnet wire, it is necessary to wind it about the support 24 and the spacing pins 46 under about 500 lbs. of tension. Therefore, when the second predetermined amount of wire 58 engages the notches 52 of the spacing pins 46, it is not possible to slide the spacing pins 46 out of the pin receiving hole 54 without damaging the wire 20. However, by rotating the spacing pins 46 approximately 90°, the flat portion 60 replaces the notched portion 50 and the pins 46 can then be removed from the pin receiving holes 54 as shown in FIG. 9.

An alternative embodiment of the present invention is shown in FIGS. 10 to 12. In this embodiment, the pin receiving holes 54 in the first and second support blocks 32 and 34 are substantially larger in diameter than the diameter of the spacing pin 46. The temporary holding means further comprises conical sections 62 having a first end 64 substantially smaller in diameter than the diameter of the pin receiving hole 54 and a second end 66 substantially larger in diameter than the diameter of the receiving hole 54. The conical sections 62 also have a central aperture 68 of approximately the same diameter as the diameter of the spacing pins 46 such that each end of the spacing pin 46 is located in a conical section 62 and the first end 64 of the conical section 62 is located in a receiving hole 54 in the support blocks 32 and 34. As shown in FIG. 11, once again first and second predetermined amounts of wire 56 and 58 are wound about the support 24 and the spacing pins 46. The second predetermined amount of wire 58 engages the notches 52 of the spacing pins 46. The spacing pins 46 are located a predetermined distance 59 from the first predetermined amount of wire 56.

In order to disengage the notches 52 from the second predetermined amount of wire 58, the conical sections 66 are loosened and removed from the pin receiving holes 54 and the ends of the spacing pins 46. This allows the spacing pins 46 to move down and away from the second predetermined amount of wire 58 as shown in FIG. 12. With the notches 52 now disengaged, the pins 46 may be pulled out of the pin receiving holes 54 leaving the formed air vents. Once the pins 46 have been removed, the first and second support blocks 32 and 34 are removed from the support 24 leaving the formed field coil with the air vents.

In general, the method for forming the above described apparatus comprises providing a support having a predetermined geometry, winding a solid strand wire about the support, placing at least one structurally rigid removable means on the support and across the wire after winding a first predetermined amount of wire, winding a second predetermined amount of wire about the support and over a portion of the removable means to form at least one coilhead air vent, and removing the structurally rigid removable means leaving the air vents.

In the above described method, placing at least one structurally rigid removable means comprises attaching first and second support blocks to the support on either side for an area in which the wire is wound, after which pin receiving holes are provided in the support blocks and the pin receiving holes in the first support block are in alignment with the pin receiving holes in the second support block. A spacing pin having first and second ends is located in the pin receiving holes in the first and second support block. The spacing pin has a substantially circular cross section and a notched portion extending a predetermined length between the first and second ends. Finally, the spacing pin is positioned near a corner of the wound wire and spaced a predetermined distance from the first predetermined amount of wire and oriented such that the notched portion will contact a second predetermined amount of wire.

In a first embodiment, the spacing pin has a flat portion entending the entire length of the pin and the spacing pin diameter is approximately equal to the pin receiving hole diameter. Removing the structurally rigid removable means comprises removing the support pin by rotating the pin approximately 90°, thereby disengaging the notched portion from the second predetermined amount of wire. The pin is then slid out of the formed air vent. The first and second support blocks are then removed from the support.

In another alternative embodiment, placing at least one structurally rigid removable means further comprises providing a conical section having a first end smaller in diameter than the pin receiving hole diameter and a second end larger in diameter than the pin receiving hole diameter. The conical section also has a central aperture of approximately the same diameter as the spacing pin diameter. The conical sections are placed with the first end first on each end of the spacing pin with the first end located in the receiving hole of the support block. Removing the structurally rigid removable means comprises removing the conical sections, thereby removing tension from the spacing pins and allowing the spacing pins to move away from the second predetermined amount of wire, thereby disengaging the notched portion. The pins are then slid out of the formed air vents and the first and second support blocks are removed from the supports.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for forming a main field coil for a dynamoelectric machine, the method comprising the steps of:
    providing a support having a predetermined geometry,
    winding a solid strand wire about said support,
    placing at least one structurally rigid removable means on said support and across said wire after winding a first predetermined amount of wire, said structurally rigid removable means having a notched portion therein,
    precision winding a second predetermined amount of wire about said support and the notched portion of said removable means to form at least one coil head air vent, and
    removing said structurally rigid removable means leaving said air vent.

2. The method defined in claim 1 wherein placing at least one structurally rigid removable means comprises:
    attaching first and second support blocks to said support on either side of an area in which said wire is wound,
    providing pin receiving holes in said support blocks, said pin receiving holes in said first support block being in alignment with said pin receiving holes in second support block,
    locating a spacing pin having first and second ends in said pin receiving holes in said first and second support blocks, said spacing pin having a substantially circular cross section and a notch portion extending a predetermined length between said first and second ends, and
    positioning said spacing pin near a corner of said wound wire, spaced a predetermined distance from said first predetermined amount of wire, and oriented such that its notched portion will contact said second predetermined amount of wire.

3. A method for forming a main field coil about a core of dynamo electric machine comprising the steps of winding a first layer of wire about the core, positioning a first temporary spacing means above the first layer, said first temporary spacing means having a notched portion extending a predetermined length thereof, winding a second layer of wire about the first temporary spacing means by placing successive turns of wire in adjacent notches of the notch portion to thereby create an air gap between said first and second layers of wire, and removing the first temporary spacing means by disengaging the notch portion from the second layer and withdrawing the temporary spacing means from the main field coil.

4. The method of claim 3 wherein the temporary spacing means comprises at least one pin having notches therein, the step of winding the second layer of wire including the step of laying each turn of wire in a notch, with successive turns being placed in adjacent notches, and the step of laying later turns of wire in adjacent crevices between adjacent turns of wire.

5. The method of claim 4 wherein the pin has a non-notched portion extending along the pin, and the step of removing the notched pin includes the steps of rotating the pin to disengage the notched portion from the wound second layer of wire, and sliding the pin from beneath the second layer of wire.

6. The method of claim 4 wherein the step of positioning the notched pin includes the steps of orienting a pair of spaced apart supports adjacent the area where the second layer of wire is desired, the notched pin extending therebetween, and securing the pair of conical sections to the ends thereof and to the supports, and wherein the step of removing the pin includes removing the conical sections from the pin ends and sliding the pin from beneath the wound second layer of wire.

7. The method of claim 4 further comprising the steps of positioning a second notched pin above the first notched pin, and winding a third layer of wire about the second notched pin by placing successive turns of wire in adjacent notches of the notched portion to thereby create an air gap between said second and third layers of wire.

8. A method for forming a main field coil having at least one air gap therein about the core of a dynamo electric machine comprising the steps of:
    winding a first layer of wire about the core,
    securing a pair of spaced apart supports to the core and extending adjacent to the area containing the field coil,
    temporarily positioning a pair of notched pins between the spaced supports, each pin having a notched portion extending a predetermined length of the pin, the pins being separated and located at opposite sides of the field coil above the first layer,
    winding a second layer of wire about the pins by placing successive turns of wire in adjacent notches of each pin's notched portion to thereby create an air gap between said first and second layers,
    removing said pins from between the supports after the second layer of wire has been wound thereabout.

9. The method of claim 8 wherein the pin has a non-notched portion extending along the pin, and the step of removing the pins includes the steps of rotating each pin to disengage the notched portion from the wound second layer of wire, and sliding each pin from beneath the second layer of wire.

10. The method of claim 8 wherein the step of temporarily positioning the pins includes fitting a pair of conical sections to the ends of each pin to mount each pin between the supports, and the step of removing the pins includes removing the conical sections and sliding each pin from beneath the second layer of wire.

11. A method for forming a main field coil for a dynamoelectric machine, the method comprising the steps of:

providing a support having a predetermined geometry, winding a solid strand wire about said support, attaching first and second support blocks to said support on either side of an area in which said wire is wound, providing pin receiving holes in said support blocks, said pin receiving holes in said first support block being in alignment with said pin receiving holes in said second support block, locating spacing pins having first and second ends in said pin receiving holes in said first and second support blocks, said spacing pins having a substantially circular cross section and a notched portion extending a predetermined length between said first and second ends, each of said spacing pins having a flat portion extending along said pins and wherein the spacing pin diameter is approximately equal to the pin receiving hole diameter, precision winding a second predetermined amount of wire about said support and the notched portion of said spacing pins to form at least one coil head air vent, said spacing pins being positioned near the corners of said wound wire, spaced a predetermined distance from said first predetermined amount of wire, and oriented such that their notched portion will contact said second predetermined amount of wire, removing said spacing pins by rotating said pins approximately 90° thereby disengaging said notched portion from said second predetermined amount of wire and sliding said pins out of said formed air vent, and removing said first and second support blocks from said support thereby leaving said air vent.

12. A method for forming a main field coil for a dynamoelectric machine, the method comprising the steps of:

providing a support having a predetermined geometry, winding a solid strand wire about said support, attaching first and second support blocks to said support on either side of an area on which said wire is wound, providing pin receiving holes in said support blocks, said pin receiving holes in said first support block being in alignment with said pin receiving holes in said second support block, locating spacing pins having first and second ends in said pin receiving holes in said first and second support blocks, said spacing pins having a substantially circular cross section and a notched portion extending a predetermined length between said first and second ends, providing a plurality of conical sections having a first end smaller in diameter than the pin receiving hole diameter and a second end larger in diameter than the pin receiving hole diameter and also having a central aperture of approximately the same diameter as the spacing pin diameter, placing said conical sections, with said first end first, on each end of said spacing pins with said first end located in said receiving hole of said support block, precision winding a second predetermined amount of wire about said support and the notched portion of said pins to form at least one coil head air vent, said spacing pins being positioned near the corners of said wound wire, spaced a predetermined distance from said first predetermined amount of wire, and oriented such that their notched portion will contact said second predetermined amount of wire, and removing said conical section, pins, and support blocks, thereby leaving said air vent.

13. The method defined in claim 12 wherein removing said structurally rigid removable means comprises removing said conical sections from said spacing pins and said pin receiving holes, thereby removing tension from said spacing pins and allowing said spacing pins to move away from said second predetermined amount of wire, thereby disengaging said notched portion, sliding said pins out of said formed air vents, and removing said first and second support blocks from said support.

* * * * *